United States Patent
Howe et al.

(10) Patent No.: US 6,802,479 B2
(45) Date of Patent: Oct. 12, 2004

(54) FLAMMABLE FLUID LINE SHROUD

(75) Inventors: Mark E. Howe, Mukilteo, WA (US); Kevin L. Loss, Augusta, KS (US); B. Kelly Sheahan, Wichita, KS (US)

(73) Assignee: The Boeing Company, Chicago, IL (US)

(*) Notice: Subject to any disclaimer, the term of this patent is extended or adjusted under 35 U.S.C. 154(b) by 12 days.

(21) Appl. No.: 10/147,392

(22) Filed: May 16, 2002

(65) Prior Publication Data

US 2003/0213871 A1 Nov. 20, 2003

(51) Int. Cl.[7] ................................................ B64C 1/00
(52) U.S. Cl. ................................ 244/129.1; 244/135 R
(58) Field of Search ........................ 244/135 R, 129.2; 137/312; 138/104, 114; 114/227

(56) References Cited

U.S. PATENT DOCUMENTS

| | | | | |
|---|---|---|---|---|
| 4,653,958 A | * | 3/1987 | Anderson et al. | 405/157 |
| 5,167,470 A | * | 12/1992 | Bertolozzi et al. | 405/52 |
| 6,039,066 A | * | 3/2000 | Selby | 137/312 |
| 6,311,730 B2 | * | 11/2001 | Penza | 138/98 |
| 6,546,951 B1 | * | 4/2003 | Armenia et al. | 137/312 |

* cited by examiner

Primary Examiner—Peter M. Poon
Assistant Examiner—Timothy D. Collins
(74) Attorney, Agent, or Firm—Harness Dickey & Pierce P.L.C.

(57) ABSTRACT

A method and apparatus contains and drains leakage from fluid system piping on a mobile platform such as an aircraft. A generally U-shaped channel is formed having outwardly oriented edge flanges and either integral or attached end plates. A pair of drain connections is disposed adjacent to each end plate. A group of fluid lines including at least one flammable fluid line is loaded within the U-shaped channel. A cover plate having outwardly oriented edge flanges aligning with the U-shaped channel edge flanges is positioned over the U-shaped channel. The edge flanges of both the cover plate and the U-shaped channel are joined with a seal such that a fluid-tight assembly results. Fluid leakage from any of the group of enclosed fluid lines discharges through the pair of drain connections. One of the end plates forms a firewall connectable to an engine firewall boundary.

34 Claims, 9 Drawing Sheets

FLAMMABLE FLUID LINE SHROUD

FIELD OF THE INVENTION

The present invention relates generally to moving platform fluid systems and more specifically to a method and device to contain and distribute leakage from aircraft mounted fluid systems.

BACKGROUND OF THE INVENTION

Modern aircraft require a variety of flammable fluids be transported between fluid storage areas and use locations. Typical examples include fluid piping between fuel tanks and engines, between hydraulic storage tanks and hydraulically operated equipment, and between lubricating oil storage areas and mechanical equipment. Fluid transport is typically through systems of piping, tubing or hoses, hereafter referred to in general as fluid lines.

Fluid leakage from flammable fluid lines which impinges other piping, wire bundles or structures is undesirable. Flammable fluid leakage adjacent a heat or ignition source is particularly undesirable for the obvious reason of aircraft safety. To contain fluid leakage, aircraft designers apply several methods, including sealing compartments through which fluid lines traverse or applying various designs of fluid line enclosures.

One current method to seal compartments involves the complex steps of applying sealing compounds during and after assembly, and installing a network of dedicated drains from each fluid trap (e.g., low point) region to avoid formation of puddles. Multiple low points within the compartment which for functional reasons cannot all be drained are often filled with a leveling compound to permit the drain network to function properly. Each seal and drain network requires confirmation via water test on every unit built.

One drawback of this approach is that all other piping, electrical wiring and structure within the compartment is exposed to any fluids that leak. Due to the chance of a leaking fluid line spraying fluid onto wire bundles, extraordinary effort is applied to the design, fabrication, and installation of wire bundles to prevent fluids from running along wires and contacting connectors. Further drawbacks include additional weight, increased labor hours during assembly to apply sealant and leveling compound, and additional time and labor to verify the quality of applied seals. The current methods also place a burden on the aircraft operators to restore the integrity of seals following maintenance actions. Also, when used, leveling compound hides the structure on which it rests, complicating or preventing visual inspection of that structure.

To prevent fluid leakage from wetting surrounding items, aircraft designers apply several designs of fluid line shrouds. Common shroud designs apply a tube or metal shroud surrounding the circumference of installed fluid piping and are used to capture and redirect flammable fluid leakage in areas including the space between flammable fluid leakage zones on the propulsion strut(s) and inside the fuselage of commercial aircraft.

An exemplary shroud design uses a dedicated sheet metal structure to surround propulsion strut fluid lines transitioning from one leakage zone to another. The sheet metal shroud comprises 2 halves assembled around the installed fluid lines, using clamp blocks and removable fasteners. The shroud halves overlap on assembly and a fillet seal is applied. The ends of the shroud are open to drain leakage into an adjacent leakage zone. Openings are provided in the clamp blocks to permit leaked fluids to flow past. Once leaked fluid exits the shroud assembly, it flows across strut structure to exit via a leakage zone drain system.

Another common propulsion strut shroud design advantageously uses a box-beam structure provided for other purposes. This structure is formed as a "U" channel. Fluid line support brackets are attached to the inside floor of the channel. Cover plates are then installed with gaskets and the forward end of the structure is sealed. Any fluid leakage flows aft onto the strut structure before exiting via a leakage zone drain system.

A further exemplary application of a common shroud design is applied over fuel line hoses supplying an auxiliary power unit (APU). The APU is frequently located in the aft end of an aircraft fuselage. The APU required fuel is delivered from the aircraft fuel system near the wing to the rear of the fuselage. To contain leakage, the APU fuel feed line is placed within a tubular shroud. The shroud is assembled from tubing and includes a dedicated drain system to purge it of any leaked fluids. The shroud is first installed between fuel supply and APU use points. The APU fuel feed line hose is then inserted within the shroud, and is supported on a shroud inner surface.

The disadvantages of common shroud designs are the lack of a firewall structure at a flammable containment end of the shroud, the general lack of dedicated drains to discharge leakage outside the aircraft rather than into another compartment or onto adjacent structure, and the inability to apply the design in a modular concept, wherein the fluid lines are preassembled within the shroud and the entire shroud assembly is installed or removed as a unit.

It is therefore desirable to provide a shroud design which overcomes the drawbacks and disadvantages of known shrouds and eliminates the need for compartmental sealing and leveling.

SUMMARY OF THE INVENTION

According to a preferred embodiment of the present invention, a shroud body internally supports one or more flammable fluid lines and associated support hardware. The combination of the shroud body, fluid lines and support hardware forms a shroud module. The shroud module can be removed/replaced as a unit if a fluid line leaks. The fluid lines are internally supported as an integral unit of fluid lines, allowing for any fluid leakage to traverse the shroud module and discharge through a drain connection disposed at both ends of the module. Shroud body supports are provided on the shroud module. The body supports are designed at a frequency to provide proper support of the shroud module and eliminate shroud body penetrations which create a potential leak path.

According to one preferred embodiment of the invention, the shroud module is installed as a unit on the propulsion strut structure of an aircraft. Each shroud module fluid line includes mechanical connections for connection to aircraft systems. All fluid connections within the shroud module are preassembled, and the shroud module is sealed before installation in the aircraft. At one sealed boundary end, the shroud module incorporates a fire-resistant, thick walled plate forming part of a firewall boundary of an aircraft. The firewall plate and its associated transition region are integrally formed. Fire-resistant tubing/piping connections are provided at the exterior, firewall boundary. Aircraft fluid lines are disconnected at these external connections to remove the module. The opposite, i.e., vapor barrier end of the shroud module is preferably provided as a thin-walled plate forming a shroud module fluid tight seal. System fluid lines at the vapor barrier end are provided with mechanical joints or terminate adjacent to the shroud, allowing shroud module removal/replacement.

In one preferred embodiment, a shroud module of the present invention comprises two major elements, a lower body and an upper cover. The lower body is formed as a generally U-shaped channel having an outwardly extending peripheral flange. The upper cover of the shroud module also has an outwardly extending peripheral flange, mating with the lower body peripheral flange to form a fluid-tight seal around the periphery of the shroud module. The lower body also includes an integral firewall, drain connections, and discrete attachment elements for installing the assembled shroud module to aircraft structure. The fluid lines and supporting clamp blocks are installed prior to upper cover assembly onto the lower body. The upper cover and lower body are preferably assembled with mechanical fasteners (with application of sealant and/or gasket materials), or by welding the flanged joint.

Fluid lines are disposed within the shroud lower body via spaced, elastomeric support blocks which, after installation, provide structural support, restraint, and physical separation between each fluid line. The support blocks are configured to allow any fluid leakage within the shroud module to flow to the drain connections. The support blocks are located at a frequency within the shroud module to provide proper support for the smallest diameter tube or pipe disposed in the module.

The shroud module of the present invention is configurable to support different aircraft engine designs requiring different firewall boundaries. The shroud module is preferably formed as a two-piece assembly, but can also be a multi-piece component. In an exemplary application, the shroud module is supported as a unit from aircraft structure such as the propulsion strut. With the exception of the firewall and its associated transition region, the shroud is preferably formed of a thin-wall, lightweight material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
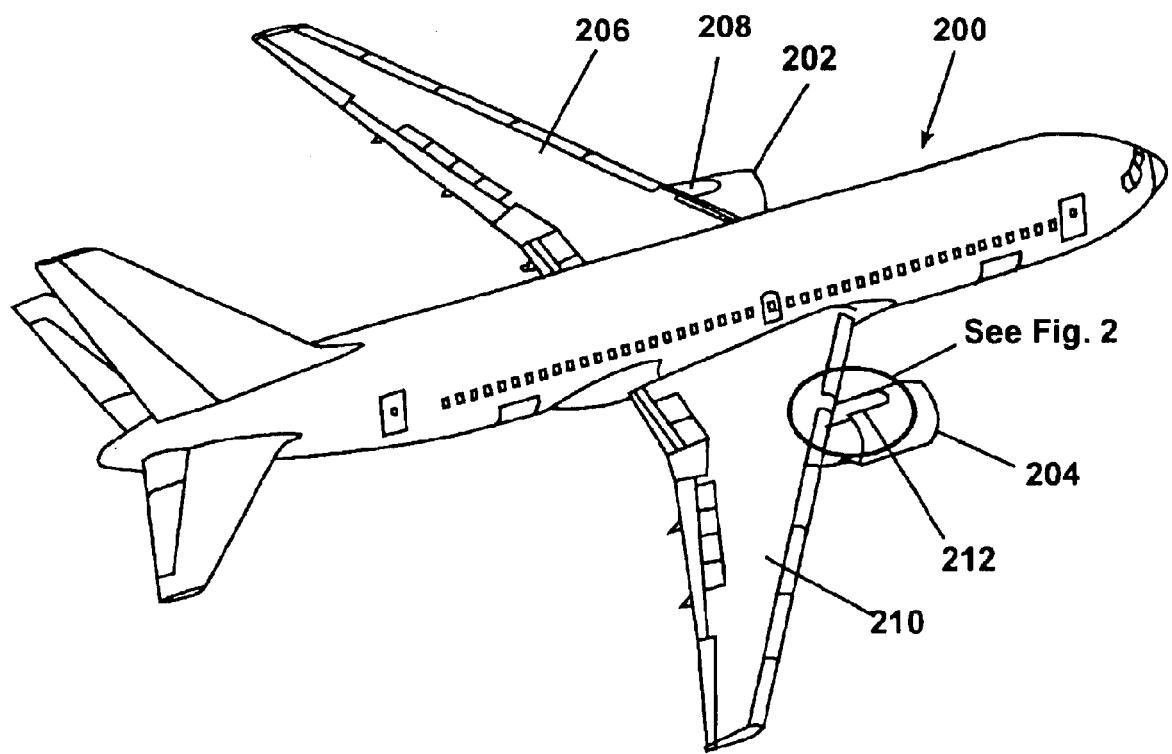
FIG. 1 is a perspective view of a commercial aircraft having two under-wing supported engines.

Referring to FIG. 1, an aircraft 200 having a port engine 202 and a starboard engine 204 is shown. The port engine 202 is supported from a port wing 206 by a port propulsion strut 208. The starboard engine 204 is similarly supported from a starboard wing 210 by a starboard propulsion strut 212.

Figure 2:
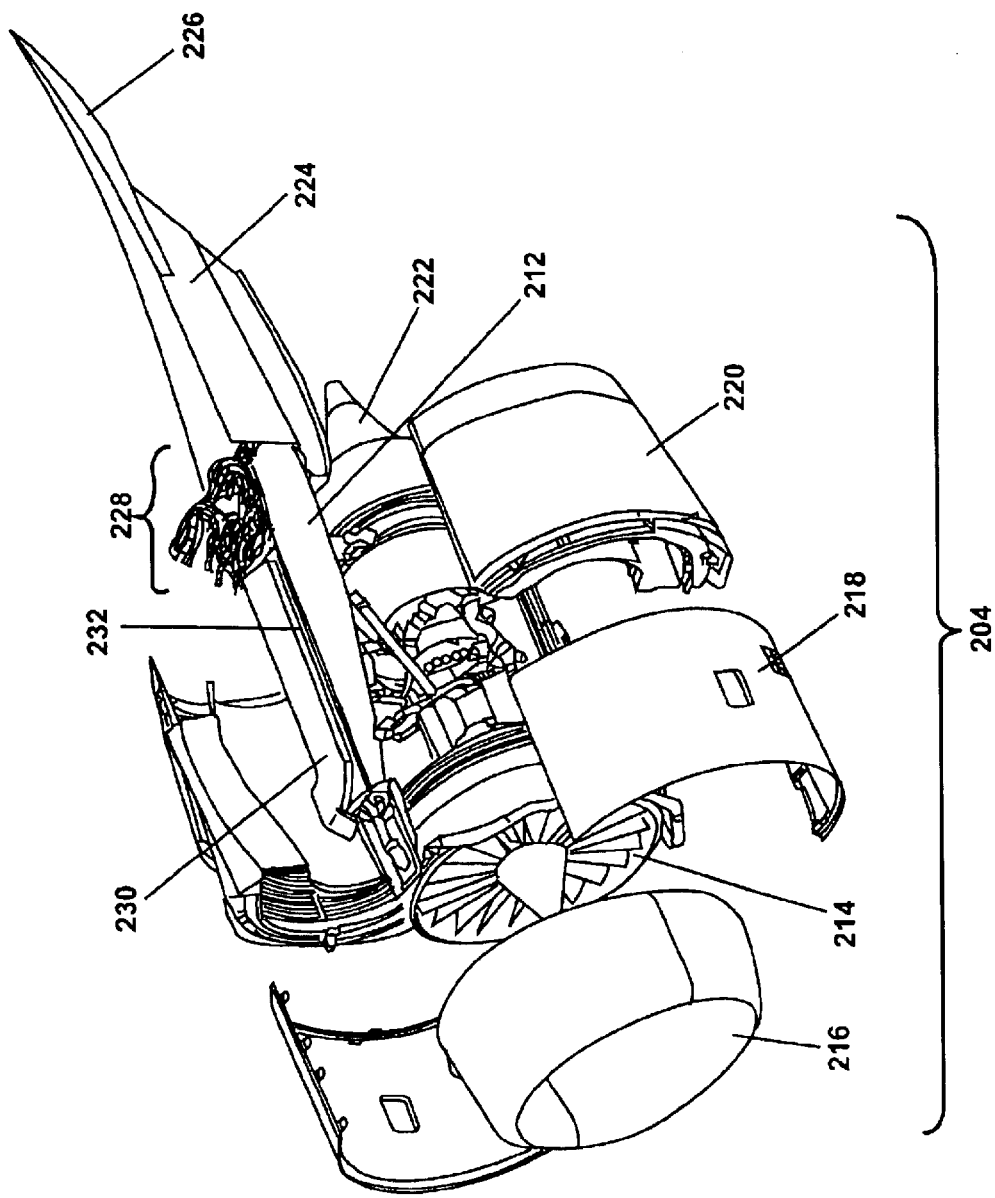
FIG. 2 is a perspective view of a preferred embodiment of the present invention, showing one of the engines of the aircraft of FIG. 1 having a shroud module of the present invention installed thereon.

Referring to FIG. 2, components of the starboard engine 204 of FIG. 1, and one preferred embodiment for a shroud module of the present invention are shown. Components for the port engine 202 of FIG. 1, or for additional engines (not shown, i.e., of a four engine aircraft or alternate engine arrangements) are similar. The starboard engine 204 comprises an engine body 214 housed within an inlet assembly 216 on a forward face thereof, a two section fan/cowl assembly 218 aft of the inlet assembly 216, a two section thrust reverser assembly 220 aft of the fan/cowl assembly 218, and a primary exhaust plug/nozzle 222 aft of the thrust reverser assembly 220. The engine body 214 is supported from the starboard propulsion strut 212. The starboard propulsion strut 212 has an aft strut fairing 224 and a trailing edge fairing 226 for improved wing aerodynamics. A plurality of fluid lines 228 runs between the starboard wing 210 (shown in FIG. 1) and the starboard propulsion strut 212. The fluid lines 228 are partially housed within a shroud module 230 of the present invention as the fluid lines 228 traverse an upper surface 232 of the starboard propulsion strut 212.

Figure 3:
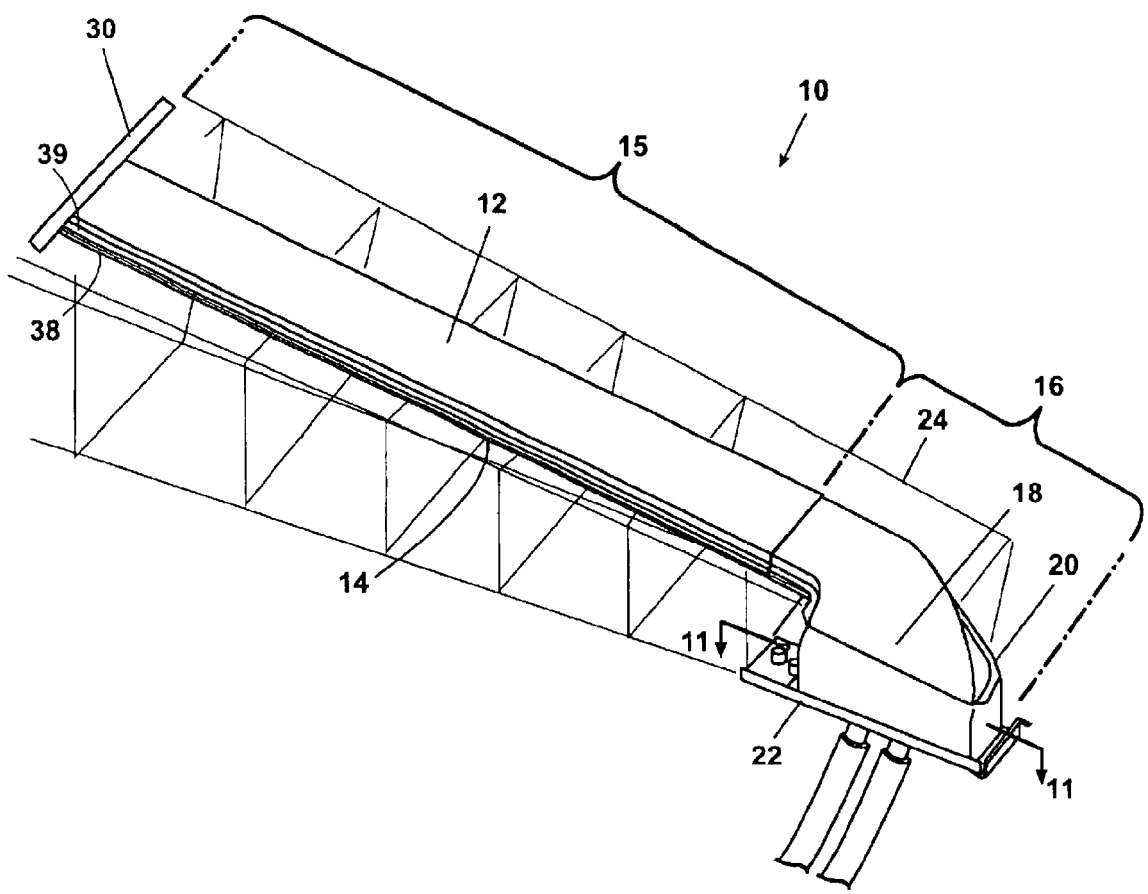
FIG. 3 is a perspective view of a shroud module of the present invention, having the shroud upper cover installed over the shroud lower body.

Referring to FIG. 3, a shroud module 10 of the present invention is shown. The shroud module 10 comprises a two-piece assembly including a shroud upper cover 12 and a shroud lower body 14. A straight body length 15 of shroud module 10 is connected to a transition region 16. The transition region 16 permits fluid lines (shown in FIG. 4) contained within shroud module 10 to change direction or plane of orientation. The transition region 16 includes a transition upper cover 18 which can be formed together with or separate from the shroud upper cover 12 and a transition lower body 20. The transition lower body 20 further includes a thick-wall plate forming a firewall 22. The firewall 22 is comprised of fire-resistant metal and is intended to be flanged and fastened or welded to a firewall boundary of an aircraft (not shown).

Figure 11:
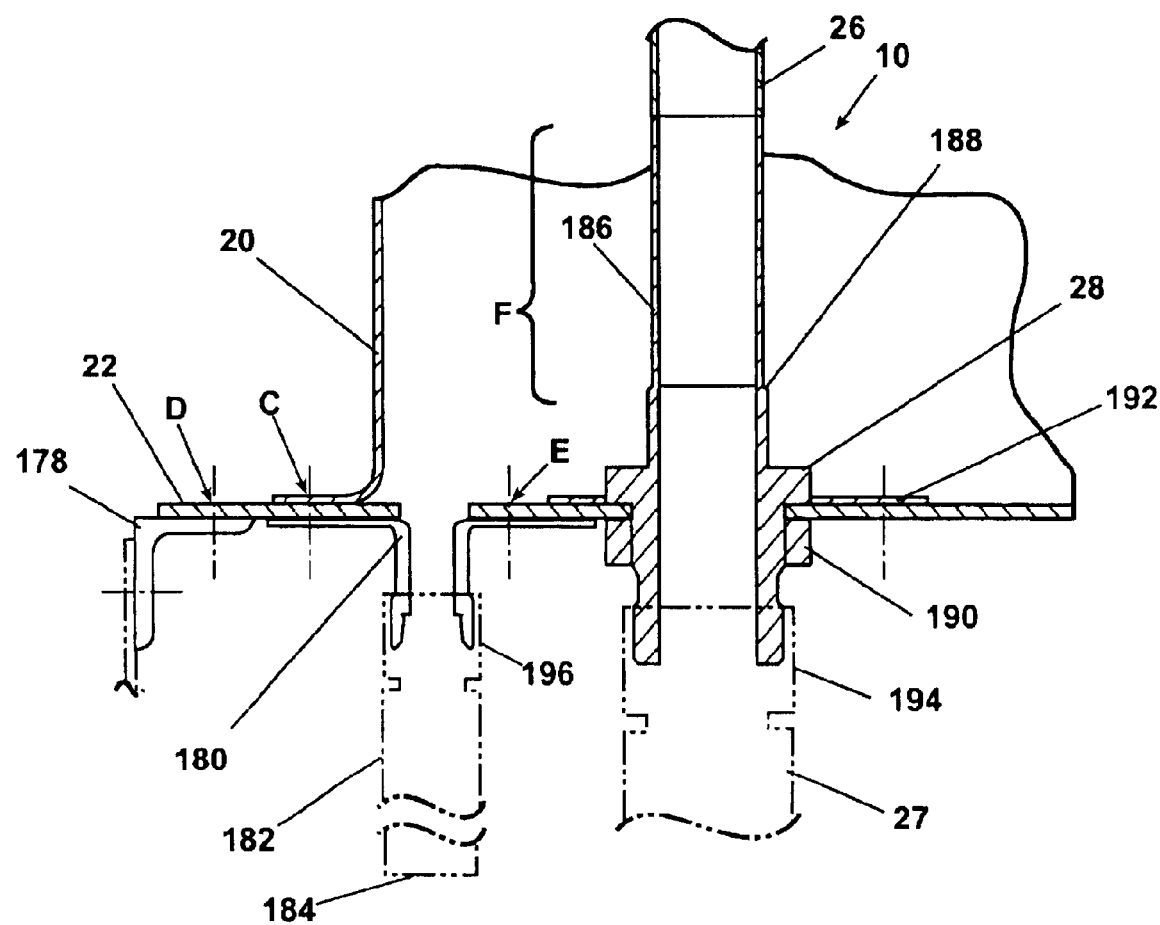
FIG. 11 is a partial section view taken along section 11—11 of FIG. 3, showing the firewall area and its fluid line and drain connectors.

The shroud module 10 of the present invention is shown supported from a wire frame model of a propulsion strut 24 of an aircraft (shown in FIG. 1). An exemplary mechanical connector 28 is shown in FIG. 11, typical of the mechanical connectors installed on the firewall 22 to provide fluid line disconnect at the firewall 22. At an opposite end of the shroud module 10 from the firewall 22 is a vapor barrier 30, which forms the fluid boundary of the shroud module 10 at this end of the shroud module 10.

Figure 4:
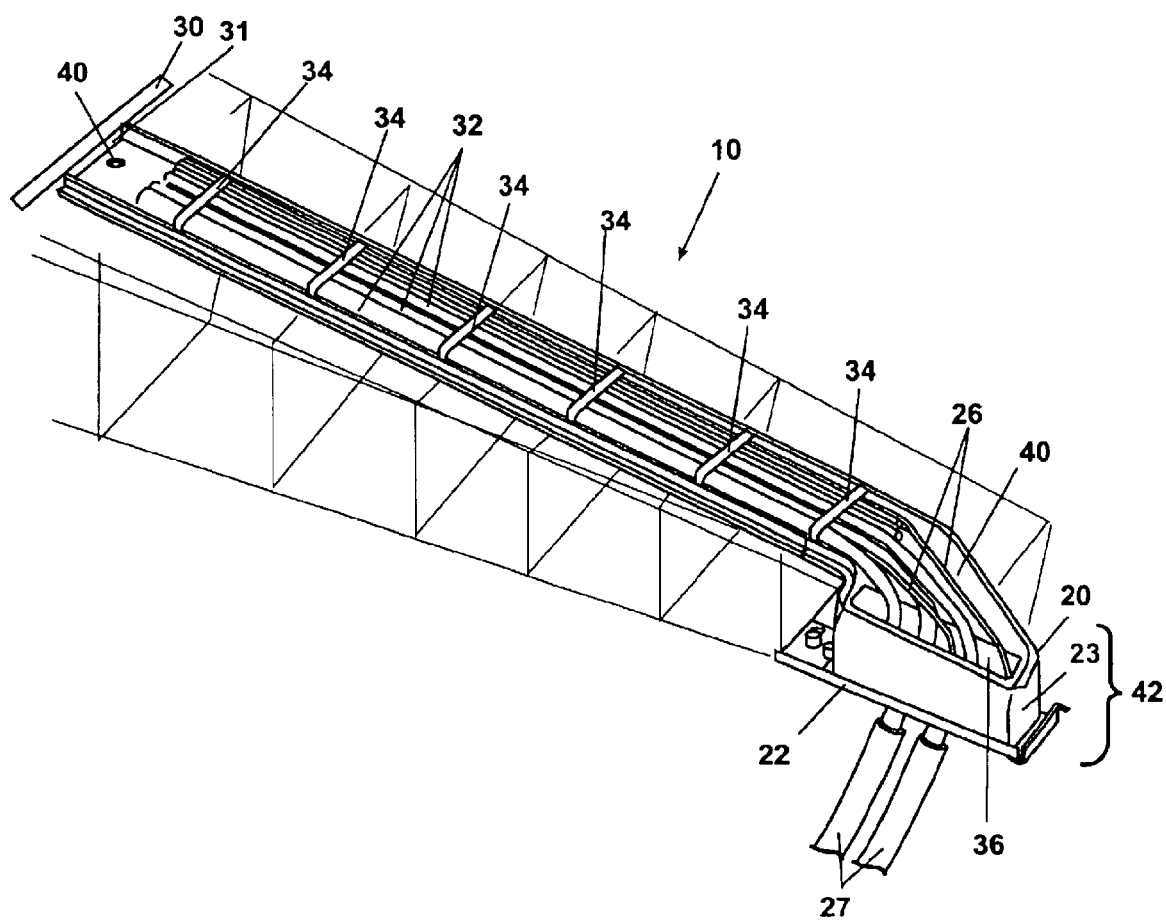
FIG. 4 is a perspective view of FIG. 3 showing the shroud module having the shroud upper cover removed and the fluid lines of the shroud module shown.

Referring now to FIG. 4, the shroud module 10 of FIG. 3 is shown, having the shroud upper cover 12 removed to show the internal arrangement. A plurality of transition fluid lines 26 supporting one or more aircraft systems is connected to the firewall 22 by one of a plurality of fire-resistant fluid lines 186 shown in FIG. 11. Each of the fire-resistant fluid lines 186 is comprised of a metal material, and connects with the fire-resistant mechanical connectors 28 shown in FIG. 11 on the firewall 22. A plurality of fluid lines 32 are shown connecting between each of the transition fluid lines 26 and the vapor barrier 30 area of the shroud module 10. The fluid lines 32 are supported at spaced intervals by a plurality of clamp blocks 34. As each of the transition fluid lines 26 enters the transition lower body 20, the transition to the fire-resistant fluid lines 186 is made, and each of the fire-resistant fluid lines 186 is disposed in a cavity 36 formed within the transition lower body 20. Each of the mechanical connectors 28 is located at the bottom of the cavity 36 and is connected to the firewall 22. Within the engine fire zone, a plurality of fire-resistant fluid lines 27 are connected to the fire-resistant fluid lines 186 of the shroud module 10 at the firewall 22, with the mechanical connectors 28.

Referring to both FIGS. 3 and 4, in order to support the shroud upper cover 12 (shown in FIG. 3) to the shroud module 10, an outwardly extending flange 38 is disposed about the perimeter of the shroud lower body 14. The flange 38 mates with an upper flange 39 on the shroud upper cover 12. The joint between the flange 38 and the upper flange 39 is sealed by welding or by the combination of a gasket (not shown) and a plurality of mechanical fasteners (not shown). At the vapor barrier 30 a vapor barrier seal 31 is formed to provide a fluid tight boundary for the shroud module 10. The vapor barrier seal 31 is preferably comprised of a thin wall metal which is provided with sufficient clearance openings for each of the plurality of fluid lines 32, and also provides a fluid tight seal on the vapor barrier 30 end of the shroud module 10. A drain connector 40 is disposed adjacent to the vapor barrier seal 31 to drain any fluid leakage from this end of the shroud module 10. The drain connector 40 is similar to the firewall drain connector 180 shown in greater detail in FIG. 11, and will therefore not be described in further detail herein.

As noted above, the firewall 22 is comprised of a thick-wall, fire-resistant material. It is also desirable to form at least a portion of the transition lower body 20 of a similar fire-resistant material. The fire-resistant fluid lines 186 in the region adjacent to a fire-resistant section 42 of the transition lower body 20 are manufactured from a high temperature, fire-resistant material. To minimize the weight of the shroud module 10, the size of the fire-resistant section 42, constructed of fire-resistant material, is preferably kept to a minimum. However, all of the components of the shroud module 10 including the shroud upper cover 12, the shroud lower body 14, the transition region 16 and the firewall 22 can be comprised of fire-resistant material. In this exemplary embodiment, all of the materials for the fluid lines 32 are also comprised of a fire-resistant material. The material for the clamp blocks 34 is preferably comprised of an elastomeric material. Therefore, the material for the clamp blocks 34 is selected from a fire-resistant elastomeric material if the shroud module is required to be of entirely fire-resistant materials.

Each of the clamp blocks 34 support each of the plurality of fluid lines 32. The clamp blocks 34 are spaced within the shroud module 10 to support the smallest diameter of the fluid lines 32. All of the fluid lines 32 and the clamp blocks 34 are modularly loaded in the shroud lower body 14 during off-site assembly. Each of the mechanical connectors 28 at the firewall 22 between the firewall 22 and the fire-resistant fluid lines 186 is mechanically made at this time. The shroud upper cover 12, including the transition upper cover 18, is then arranged over the shroud lower body 14, including the transition lower body 20, and the junction between the shroud lower body 14 and the shroud upper cover 12 is sealed. The shroud module 10 is then mounted on the propulsion strut 24 of the aircraft.

Figure 5:
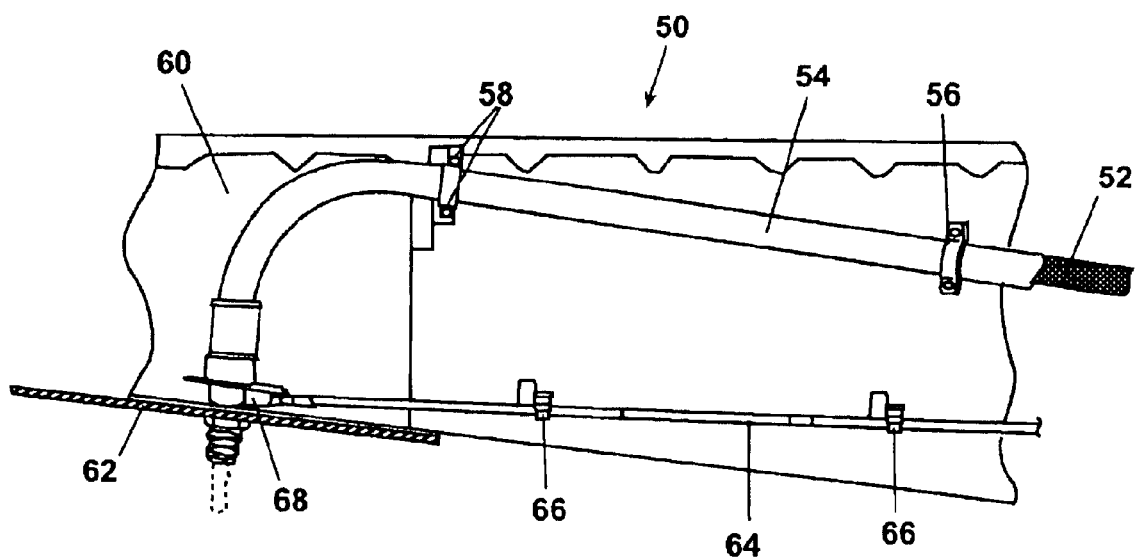
FIG. 5 is an elevation view of an auxiliary propulsion unit shrouded hose assembly known in the art.

FIGS. 5 and 6 provide exemplary shroud designs commonly used in commercial aircraft. Referring to FIG. 5, an auxiliary propulsion unit (APU) shrouded hose 50 known in the art is shown, The APU shrouded hose 50 is comprised of a flexible fuel hose 52 which is inserted into a tube 54. The tube 54 is installed in the aircraft, normally in a fuselage area, and is mounted using a plurality of tube clamps 56 which are fastened to the aircraft structure by a plurality of clamp fasteners 58. The APU shrouded hose 50 is installed in the inner fuselage 60 as shown. The intent of the APU shrouded hose 50 is to contain any fuel leakage from the flexible fuel hose 52 and lead the fuel leakage to a dedicated drain.

A fuselage boundary joint 62 normally joins the APU shrouded hose 50 to the aircraft structure. A dedicated drain line 64 is lead away from the APU shrouded hose 50 and is supported by a plurality of drain tube clamps 66. The dedicated drain line 64 is connected to the APU shrouded hose 50 by a drain fitting 68. The flexible fuel hose 52 is supported throughout its length by the inner walls of the tube 54. Static or dynamic loads of the flexible fuel hose 52 are therefore not accommodated by the design of the APU shrouded hose 50. The APU shrouded hose 50 does not provide for modular installation of the entire unit of the flexible fuel hose 52 and the tube 54. A firewall is also not provided by the APU shrouded hose 50.

Figure 6A:
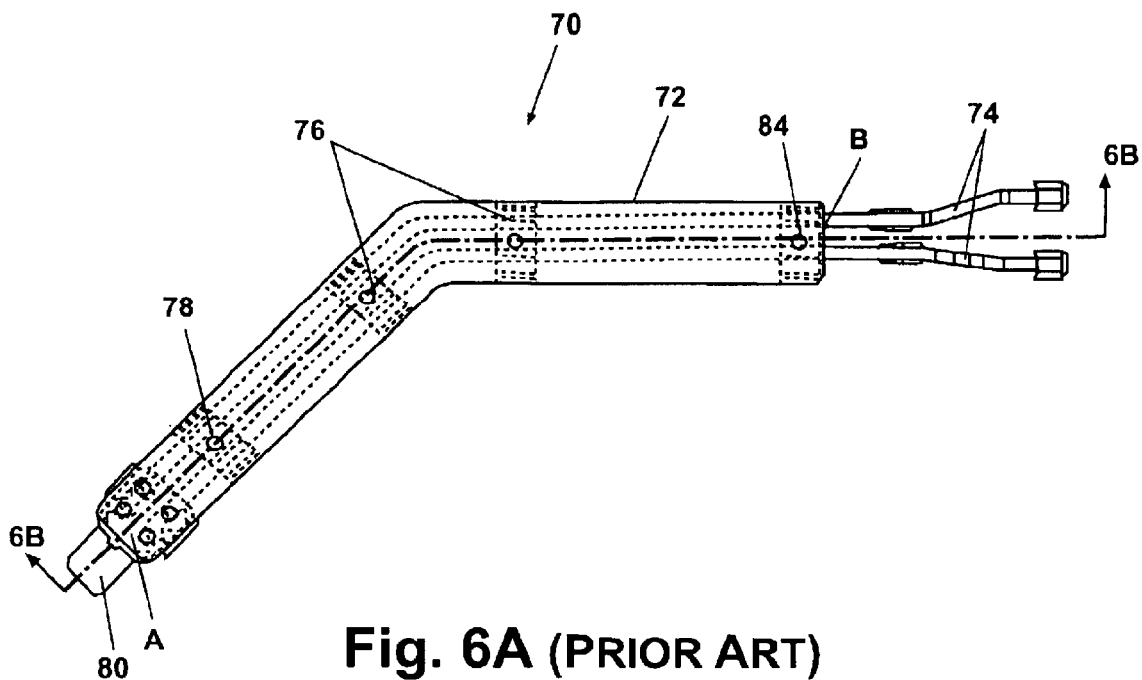
FIG. 6A is a plan view of a common propulsion strut shroud assembly having internally supported fluid lines and open ends for drainage.
Figure 6B:
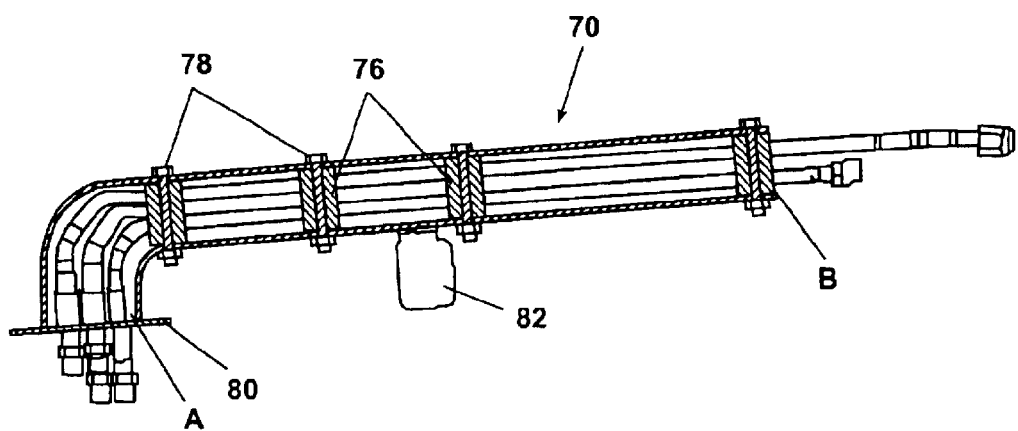
FIG. 6B is a section view taken along section 6B—6B of the propulsion strut shroud assembly of FIG. 6A further showing the fluid line support elements and through bore supporting fasteners.

Referring now to both FIGS. 6A and 6B, a propulsion strut shroud assembly 70 known in the art is shown. The propulsion strut shroud assembly 70 is comprised of a two-piece shroud body 72, a plurality of fluid lines 74, a plurality of clamp blocks 76 supporting the fluid lines 74, and a plurality of fasteners 78 which join the halves of the shroud body 72 and also restrain the clamp blocks 76 about each of the fluid lines 74. The clamp blocks 76 provide fluid passages (not shown) to allow any fluid leakage from any of the fluid lines 74 to pass through the shroud body 72 to either shroud end identified by letters A and B, respectively. The propulsion strut shroud assembly 70 is supported from aircraft structure (not shown) by a support plate 80 and a support plate 82 respectively.

The propulsion strut shroud assembly 70 is installed over existing installed fluid lines 74. Each of the halves of the shroud body 72 are mounted about the installed fluid lines 74 after the clamp blocks 76 are installed on the fluid lines 74. Each of the fasteners 78 is then installed through preformed apertures (not shown) through the shroud body 72 and fastened to form the shroud body 72. A seal (not shown) of a sealing material is applied along the joints of the halves of the shroud body 72. Each of the fluid lines 74 extends through the entirety of the propulsion strut shroud assembly 70, where connections to continuing system piping are made. Any leakage from any of the fluid lines 74 is captured within the shroud body 72 and transfers to either end A or end B of the shroud body 72. Any leakage discharges through either of the ends A or B, either onto structure or into drain areas provided within the zones outside of the propulsion strut shroud assembly 70.

No dedicated drain lines are provided for the propulsion strut shroud assembly 70. If leakage is detected at either end A or end B, the seal between the halves of the shroud body 72 is broken and each fastener 78 is removed such that the shroud body 72 can be removed and the leaking one of the fluid lines 74 is repaired or replaced. The propulsion strut shroud assembly 70 of FIGS. 6A and 6B does not provide for modular installation. The propulsion strut shroud assembly 70 also does not provide for a firewall or thick-wall construction suitable for fire-zone applications. A further disadvantage of the propulsion strut shroud assembly 70 is the plurality of apertures required for each fastener 78 provide potential leakage paths for leaking fluid to exit the propulsion strut shroud assembly 70 at other than end A or end B.

Figure 7:
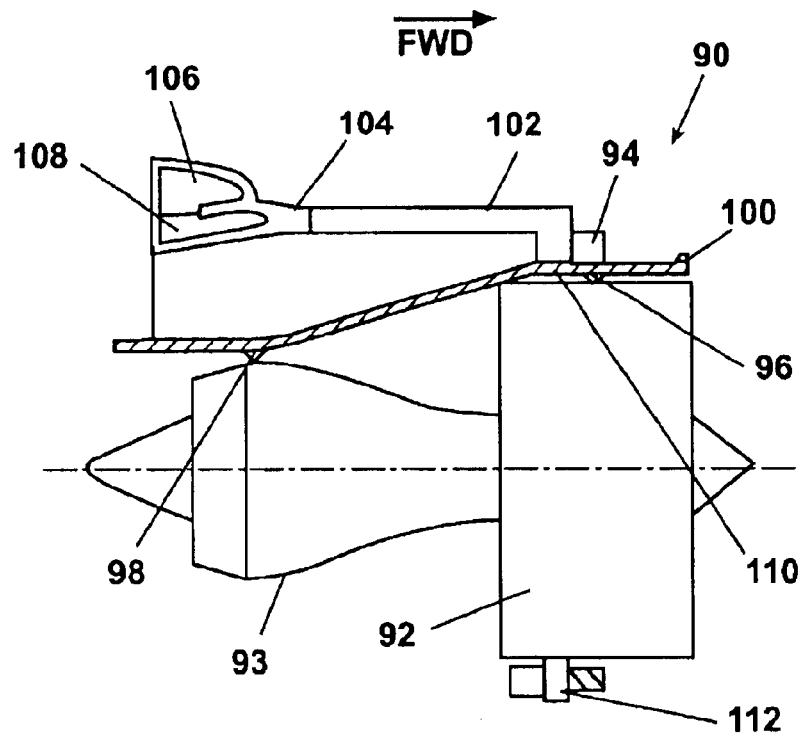
FIG. 7 is a side elevation view of a first engine configuration using the shroud module of the present invention.

Referring now to FIGS. 7–10, preferred embodiments of shroud modules of the present invention which are modified for each of four different engine configurations are shown. FIG. 7 shows a first engine configuration 90. First engine configuration 90 comprises an engine fan 92, and an engine body 93. The engine fan 92 and the engine body 93 are both supported from a propulsion strut 94 by a forward engine mount 96 and an aft engine mount 98. A firewall boundary 100 is shown. The firewall boundary 100 is comprised of a portion of the propulsion strut 94 and is formed as a boundary between the engine and the aircraft structure.

An exemplary shroud module 102 of the present invention is shown. The shroud module 102 is connected at its aft end to the under wing vapor barrier 104 which is adjacent to a wing leading edge 106. The wing leading edge 106 also forms a flammable fluid leakage control zone 108. Any leakage from fluid lines within the shroud module 102 drains in the aft direction into the flammable fluid leakage control zone 108. A firewall 110 is located at the forward end of the shroud module 102. The firewall 110 forms the containment boundary between the shroud module 102 and the firewall boundary 100. In one engine design shown by FIG. 7, the first engine configuration 90 comprises an engine having its engine gear box 112 mounted on the engine fan 92.

Figure 8:
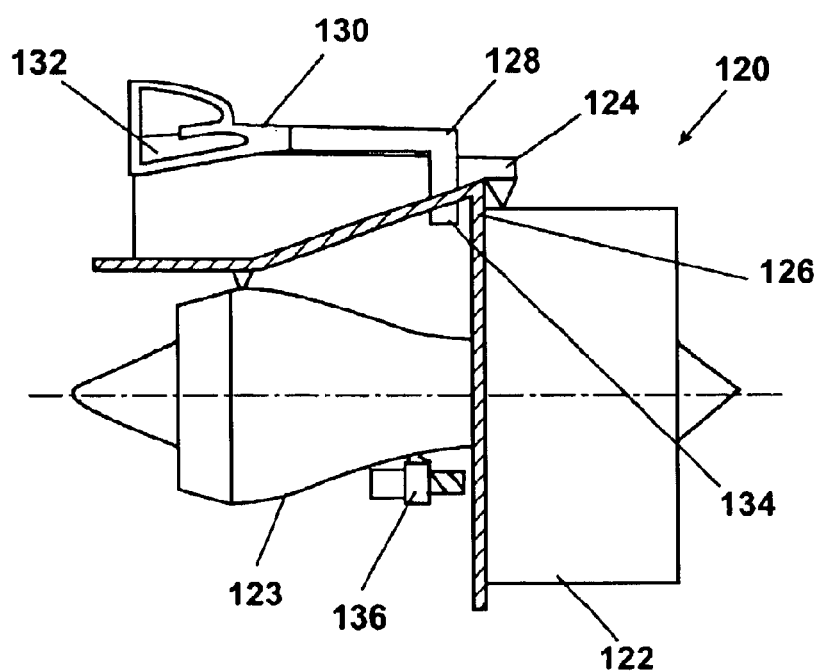
FIG. 8 is a side elevation view of a second engine configuration showing the shroud module of the present invention penetrating a firewall relocated from the firewall position shown in FIG. 7.
Figure 9:
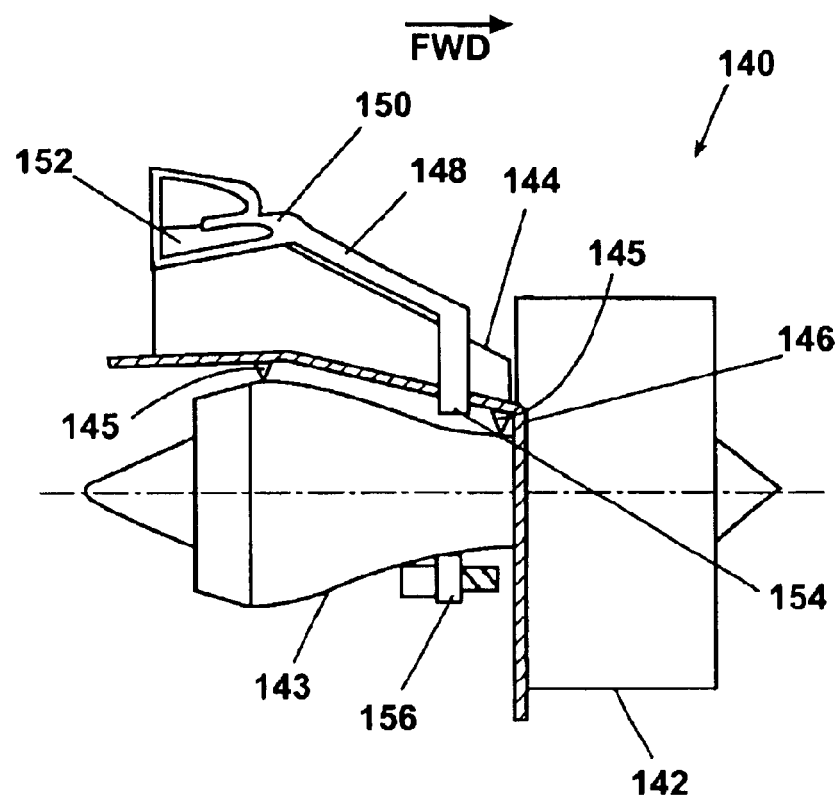
FIG. 9 is a side elevation view of a third engine configuration having the engine body mounts fully supported by the propulsion strut structure and a shroud module of the present invention penetrating the firewall boundary.
Figure 10:
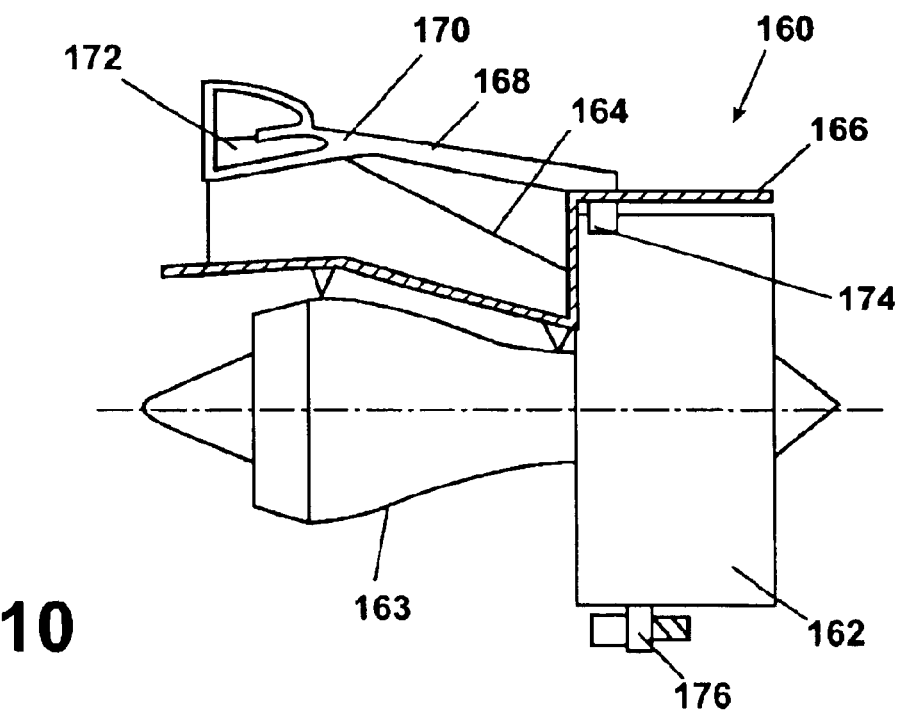
FIG. 10 is a side elevation view of a fourth engine configuration showing a modified firewall from the firewall of the FIG. 9 arrangement and a shroud module of the present invention.

The arrangements shown in FIGS. 8, 9 and 10 are variations of the engine design and resulting preferred embodiments of the shroud module of FIG. 7. Therefore, only the differences between FIGS. 8, 9 and 10 and FIG. 6 will be discussed further.

Referring now to FIG. 8, a second engine configuration 120 is shown. The second engine configuration 120 comprises an engine fan 122 mounted on an engine body 123. The engine fan 122 and engine body 123 are both supported from the propulsion strut 124. The firewall boundary 126 formed for this engine configuration follows the underside of the propulsion strut 124 forward to the aft face of the engine fan 122. A shroud module 128 is therefore shortened in this engine configuration. The aft end of the shroud module 128 traverses an under-wing vapor barrier 130 and opens into a flammable fluid leakage control zone 132.

Similar to the arrangement of FIG. 7, the flammable fluid leakage control zone 132 is the collection location for any fluid leakage from the individual fluid lines out the after end of the shroud module 128. The forward end of the shroud module 128 is comprised of the firewall 134. The firewall 134 penetrates or forms part of the firewall boundary 126 aft of the engine fan 122 as shown. The firewall boundary 126 for the second engine configuration 120 is configured aft of the engine fan 122 because with this engine design, the engine gear box 136 is mounted on the engine body 123 rather than the engine fan 122. The lubricating oil supplied to the engine gear box 136 is therefore contained aft of the engine fan 122, thereby reducing the envelope size of the firewall boundary 126.

Referring to FIG. 9, a third engine configuration 140 is shown. The third engine configuration 140 comprises an engine fan 142 mounted on an engine body 143. A propulsion strut 144 is reduced in length for the third engine configuration 140 because a pair of engine mounts 145 are both connected to the engine body 143 and do not connect to the engine fan 142. A firewall boundary 146 is therefore formed at the underside of the propulsion strut 144 and continues forward to the aft face of the engine fan 142. A reduced length shroud module 148 is therefore provided.

The aft end of the shroud module 148 penetrates an under-wing vapor barrier 150 and fluid leakage from the fluid lines within the shroud module 148 discharges from the aft end of the shroud module 148 into a flammable fluid leakage control zone 152. A firewall 154 which is integrally formed with the shroud module 148 is connected at the firewall boundary 146 similar to the previous designs. In addition to having both the engine mounts 145 connected to the engine body 143, an engine gear box 156 for the engine design of the third engine configuration 140 is also connected to the engine body 143, therefore permitting the reduced size firewall boundary 146 of this configuration.

Referring now to FIG. 10, a fourth engine configuration 160 is shown. The fourth engine configuration 160 differs from the third engine configuration 140 shown in FIG. 9 in that the engine gear box 176 is mounted on an engine fan 162 in the fourth engine configuration 160. The fourth engine configuration 160 comprises the engine fan 162 supported from an engine body 163. Both the engine fan 162 and the engine body 163 are supported by a propulsion strut 164. A firewall boundary 166 is formed for the fourth engine configuration 160 generally following the underside of the propulsion strut 164 to the aft face of the engine fan 162 and then up and over the upper surface of the engine fan 162. A shroud module 168 of the present invention is shown attached at an aft end to an under-wing vapor barrier 170 wherein a flammable fluid leakage control zone 172 is located. Any fluid line leakage from within the shroud module 168 to its aft end will be collected in the flammable fluid leakage control zone 172. The forward end of the shroud module 168 includes a firewall 174 which is disposed at a junction between the engine fan 162 and the firewall boundary 166. The firewall boundary 166 of the fourth engine configuration 160 is disposed above the engine fan 162 because the engine gear box 176 is mounted from the engine fan 162.

Referring back to FIG. 3, the shroud module 10 of the present invention provides a firewall 22 at the end of the shroud module common to the strut to engine interface, the interface herein defined as a firewall boundary. The firewall 22 also acts as a fluid boundary for leakage from any fluid line of the shroud module 10. The end of the shroud module 10 nearest the strut to wing interface has a fluid leakage boundary, the vapor barrier seal 31. The vapor barrier seal 31 interfaces with the vapor barrier 30 that forms one boundary of a flammable leakage control zone (e.g., item 108 of FIG. 7). Tubing exits the shroud module 10 aft of the vapor barrier 30, and leakage discharges into the flammable leakage control zone, to permit connecting each fluid line to its respective interface with the wing mounted system.

Referring now to FIG. 11, a partial section view of the transition lower body 20 of the shroud module 10 shows the transition lower body 20 connected to the firewall 22 by a plurality of fasteners (not shown) at a typical fastener location C. The firewall 22 is fastenably connected to the propulsion strut structure 178 by a plurality of fasteners (not shown) at a typical fastener location D. A firewall drain connector 180, one of two (2) shroud module 10 drain connections, is shown. The firewall drain connector 180 drains any fluid line leakage from the firewall 22 region of the shroud module 10. A firewall drain plumbing line 182, shown in phantom, is connected to the firewall drain connector 180 by a mechanical connector 196. Both the transition lower body 20 and the firewall drain connector 180 are shown sharing a common fastener location C. Presence of fluid at a firewall plumbing discharge point 184 indicates that at least one leaking or damaged fluid line exists within the shroud module 10. Since the firewall drain plumbing line 182 transitions a fire-zone of the aircraft, the firewall drain plumbing line 182 is comprised of a fire-resistant material.

The fire-resistant fluid line 186 is similar in size to each of the plurality of fluid lines 32 (shown in FIG. 4) disposed within the shroud module 10. In the preferred embodiment shown in FIG. 11, an exemplary transition fluid line 26 connects to the fire-resistant fluid line 186 at the boundary of the area F. The fire-resistant fluid line 186 then transitions to the mechanical connector 28 within the area F via a weld joint 188. The mechanical connector 28 is fastenably connected to the firewall 22 by a mechanical retention feature. In a preferred embodiment, the mechanical retention feature is a jam nut 190. Other mechanical retention features known in the art can also be used such a pins, lock-nuts and doubled nuts. The mechanical connector 28 is prevented from rotation due to fluid line assembly motion by an anti-torque retainer 192.

An exemplary fire-resistant fluid line 27 is connected to the mechanical connector 28 by a disconnect fitting 194. The firewall drain connector 180 is similarly connected to the firewall drain plumbing line 182 by a disconnect fitting 196. If a leaking fluid line is indicated by fluid discharge at the firewall plumbing discharge point 184, the disconnect fittings 194 and 196, respectively, are disconnected to enable removal/replacement of the shroud module 10.

Referring back to FIG. 4, the shroud drain connector 40 is similar to the firewall drain connector 180 (shown in FIG. 11), having its own drain connection (not shown) similar to the firewall drain connector 180, its own shroud plumbing drain line (not shown), similar to the firewall drain plumbing line 182, and its own disconnect fitting (not shown) similar to the disconnect fitting 196. The shroud plumbing drain line is preferably provided as a non-fire-resistant material.

Penetrations in the shroud module 10 are avoided, and preferably eliminated, since each penetration in a shroud module must be sealed to establish and maintain fluid-tight integrity of the assembled shroud module 10. The shroud module 10 reduces the risk of flammable fluid contamination of structure, equipment, and wiring. Since any shroud module 10 fluid leakage discharges to an overboard location, and since the use of sealant/leveling compound is reduced or eliminated in the propulsion strut area, visual inspection of the propulsion strut is also improved.

The shroud module of the present invention provides several advantages. As a modular design, a pre-assembled configuration of fluid lines are loaded and the shroud module installed as a unit, with a reduction in interfaces and installation time. Any leakage within the shroud module is captured and conveyed overboard via dedicated shroud drain connections. Containing leakage within the shroud module greatly reduces, or eliminates, the need for ensuring that a compartment containing the shroud module is fluid-tight, and eliminates the potential that fluid line leakage can spray adjacent piping, wiring or structure. Dedicated shroud module drains facilitate detection of leaks. In one preferred embodiment, the shroud module provides an integral firewall, permitting the shroud module to be mounted adjacent to a fire-zone. The shroud module of the present invention is also adaptable to any location in a mobile platform requiring fluid line leakage isolation.

The description of the invention is merely exemplary in nature and, thus, variation that do not depart from the gist of the invention are intended to be within the scope of the invention. Such variations are not to be regarded as a departure from the spirit and scope of the invention. Therefore, while this invention has been described in connection with particular examples thereof, the true scope of the invention should not be so limited since other variations will become apparent to the skilled practitioner upon a study of the drawings, specification and the following claims.

What is claimed is:

1. A fluid containment enclosure for a moving platform, said enclosure comprising:

a substantially metal and rigid shroud having a fluid tight seal formed about an enclosed volume;

said enclosed volume containing at least one fluid system having a group of selected fluid lines;

said shroud having at least one drain connection for discharging leakage from said selected fluid lines to a discharge location off said platform; and said shroud and said group of selected fluid lines forming a module, said module having connectable fluid line fittings for installation of said module onto said platform said shroud being formed of the two elements, a generally C-shaped channel and a cover.

2. The enclosure of claim 1, further comprising:

said C-shaped channel and said cover connected by a sealable joint forming a fluid tight boundary.

3. The enclosure of claim 2, wherein said sealable joint is formed as a pair of mechanically fastened flanges having one of a gasket and a sealing material disposed there between.

4. The enclosure of claim 3, further comprising:

said shroud having at least one internal fluid line support member, each said member disposed at an interval therein; and each support member having fluid passages allowing said leakage to drain to any one of said at least one drain connections.

5. The enclosure of claim 2, further comprising:

said at least one fluid system including at least one flammable fluid system;

said C-shaped channel having a firewall end disposable between said shroud and an aircraft firewall boundary; and said firewall end forming a high temperature containment boundary between said at least one flammable fluid system and said aircraft firewall boundary.

6. The enclosure of claim 5, further comprising:

said firewall end having a plurality of mechanical fittings attached thereto;

each mechanical fitting having a shroud facing end including a mechanical retention feature, and an aircraft system facing end; and each of said plurality of fluid lines being connected to said shroud facing end of a select one of said mechanical fittings using its mechanical retention feature.

7. The enclosure of claim 6, wherein said mechanical retention feature comprises a jam nut.

8. The enclosure of claim 6, wherein said lower C-shaped channel further comprises a sealed end opposite to said firewall end, said sealed end forming a portion of said fluid tight boundary of said shroud.

9. The enclosure of claim 8, wherein said at least one drain connection further comprises a firewall drain adjacent said firewall end and a vapor barrier drain adjacent said sealed end.

10. The enclosure of claim 2, wherein said sealable joint is formed as a pair of clamped joints having one of a gasket and a sealing material disposed there between.

11. The enclosure of claim 2, wherein said sealable joint is formed as a welded joint.

12. The enclosure of claim 1, further comprising:

said shroud being formed as a single piece shell having opposed open ends;

said group of selected fluid lines being slidably disposed through one of said opposed open ends; and a pair of end covers each forming a fluid tight boundary at one of said opposed open ends of said shroud.

13. The enclosure of claim 12, further comprising:

one of said pair of end covers forming a high temperature firewall;

the other of said pair of end covers forming a thin wall low temperature boundary; and both said firewall and said thin wall low temperature boundary being weldably joined to said shroud.

14. An aircraft leakage containment apparatus for enclosing a group of fluid lines, said apparatus comprising:

a shroud forming a fluid-tight containment boundary about said group of fluid lines;

said group of fluid lines being supported within said shroud by a plurality of elastomeric support members;

said fluid lines within said shroud being directionally changed within at least one transition region;

said shroud having a pair of drains for collecting leakage from said plurality of fluid lines for discharge outside of said segment; and said shroud having an integral disconnect panel disposed at one end thereof.

15. The shroud of claim 14, wherein at least one of said group of fluid lines comprises a flammable fluid line transporting a flammable fluid therein.

16. The shroud of claim 15, wherein said integral disconnect panel further comprises a firewall to isolate said flammable fluid from an aircraft combustion source.

17. The shroud of claim 16, wherein said fluid lines are comprised of fire-resistant material at least adjacent to said firewall.

18. The shroud of claim 17, further comprising:

said shroud being formed of two primary construction parts, a lower part integrating said firewall and said drains in a U-shaped channel, said U-shaped channel further housing said elastomeric support members and said fluid lines, and an upper part forming a sealing surface for said lower part;

each of said lower part and said upper part having outwardly oriented flanges; and said flanges having one of a gasket and a sealing material disposed there between.

19. The shroud of claim 18, wherein said lower part further comprises a sealable end disposed opposite said firewall, said sealable end formed intergrally with said lower part.

20. The shroud of claim 19, further comprising:

said lower part formed as a casting, said lower part casting including said firewall; and said upper part formed as a casting, said upper part casting having a closure panel to matably seal said firewall.

21. The shroud of claim 20, wherein said shroud is shaped to conform to an aircraft propulsion strut segment.

22. A fluid containment enclosure for a moving platform, said enclosure comprising:

a shroud having a fluid tight seal formed about an enclosed volume;

said enclosed volume containing at least one fluid system having a group of selected fluid lines;

said shroud having at least one drain connection for discharging leakage from said selected fluid lines to a discharge location off said platform;

said shroud and said group of selected fluid lines forming a module, said module having connectable fluid line fittings for installation of said module onto said platform;

said shroud being formed of two elements, a lower generally C-shaped channel and an upper cover; and said lower C-shaped channel and said upper cover operably connected by a sealable joint forming a fluid tight boundary.

23. The enclosure of claim 22, wherein said sealable joint is formed as a pair of mechanically fastened flanges having one of a gasket and a sealing material disposed there between.

24. The enclosure of claim 23, further comprising:

said shroud having at least one internal fluid line support member, each said member disposed at an interval therein; and each support member having fluid passages allowing said leakage to drain to any one of said at least one drain connections.

25. The enclosure of claim 22, further comprising:

said at least one fluid system including at least one flammable fluid system;

said lower C-shaped channel having a firewall end disposable between said shroud and an aircraft firewall boundary; and said firewall end forming a high temperature containment boundary between said at least one flammable fluid system and said aircraft firewall boundary.

26. The enclosure of claim 25, comprising:

said firewall end having a plurality of mechanical fittings attached thereto;

each mechanical fitting having a shroud facing end including a mechanical retention feature, and an aircraft system facing end; and each of said plurality of fluid lines being connected to said shroud facing end of a select one of said mechanical fittings using its mechanical retention feature.

27. The enclosure of claim 26, wherein said mechanical retention feature comprises a jam nut.

28. The enclosure of claim 25, wherein said lower C-shaped channel further comprises a sealed end opposite to said firewall end, said sealed end forming a portion of said fluid tight boundary of said shroud.

29. The enclosure of claim 28, wherein said at least one drain connection further comprises a firewall drain adjacent said firewall end and a vapor barrier drain adjacent said sealed end.

30. The enclosure of claim 22, wherein said sealable joint is formed as a pair of clamped joints having one of a gasket and a sealing material disposed there between.

31. The enclosure of claim 22, wherein said sealable joint is formed as a welded joint.

32. The enclosure of claim 22, further comprising;
   said shroud being formed as a single piece shell having opposed open ends;
   said group of selected fluid lines being slidably disposed through one of said opposed open ends; and
   a pair of end covers each forming a fluid tight boundary at one of said opposed open ends of said shroud.

33. The enclosure of claim 32, further comprising:
   one of said pair of end covers forming a high temperature firewall;
   the other of said pair of end covers forming a thin wall low temperature boundary; and
   both said firewall and said thin wall low temperature boundary being weldably joined to said shroud.

34. A fluid containment enclosure for a mobile platform, said enclosure comprising:
   a substantially metal shroud having a fluid tight seal formed about an enclosed volume;
   said enclosed volume containing at least one fluid system having a group of selected fluid lines, including at least one flammable fluid line;
   said shroud having at least one drain connection for discharging leakage from said selected fluid lines to a discharge location off said mobile platform; and
   said shroud and said group of selected fluid lines forming a module, said module having connectable fluid line fittings for installation of said module onto said mobile platform said shroud being formed of the elements, a generally C-shaped channel and cover.

* * * * *